Patented Nov. 12, 1940

2,221,341

UNITED STATES PATENT OFFICE 2,221,341

METHOD OF PREPARING PETROLEUM WAXES FOR COATING CONTAINERS

George D. Beal, Pittsburgh, Pa., assignor to Continental Can Company, Inc., New York, N. Y., a corporation of New York No Drawing. Application May 21, 1938, Serial No. 209,375

1 Claim. (Cl. 196—21)

The invention relates generally to the art of purifying waxes and has for an object to provide a novel method of preparing or purifying petroleum waxes so as to adapt them for use in lining or interiorly coating containers in which beverages are packaged for the market.

It is well known that beer if it contacts with certain metals, notably tin and iron, will be clouded. Likewise certain fruit juices, notably cranberry juice, which in addition to organic acids contain vegetable coloring matters and tannins, become badly discolored, or blackened, upon contact with even an infinitesimal amount of exposed iron. Efforts have been made to cover the interior surfaces of sheet metal containers with a nonmetallic substance so as to prevent the beer or juices from contacting therewith. Substances which are particularly suitable for this purpose are the waxes obtained from still residues derived from the distillation of petroleum oils. These waxes are usually referred to as petrolatum waxes. Such a wax or combination of waxes may be applied by flowing the same over the inner surfaces of the containers after they have been fabricated. Upon the draining and cooling of the applied substance, coatings or linings for the containers are thus completed which remain firm and hard during the pasteurization of the beer or juice and which will not crack or craze if the wall of the container is bent or indented during handling at refrigerating temperatures. While the petrolatum waxes as obtained commercially satisfactorily cover the metal surface and prevent the beverage from contacting with the metal, it has been impossible heretofore to so refine and purify these waxes as to eliminate entirely therefrom objectionable flavors and odors which are taken up and absorbed into the beer or juice. This is due to the fact that in the process of extracting petrolatum waxes from petroleum residues, and in their fractionations by selective solvent treatment, they become contaminated with various high-boiling solvents and a substantial degree of oxidation occurs during the manipulation and storage of the wax.

The invention therefore seeks to provide novel method steps which may be utilized in purifying these petrolatum waxes adaptable to the use in the lining or interior coating of beverage containers so as to eliminate therefrom all properties capable of imparting to the contained beverage undesirable flavors and odors.

In its more detailed nature, the invention resides in first purifying the petrolatum wax or waxes by rendering the same fluid and percolating the fluid wax through a bed of suitable carbon filter material or by agitating the fluid wax in a suitable quantity of such material and then separating the wax from the material by filtration, and then passing steam through the filtered wax for removing therefrom any entrained low-boiling hydrocarbons or derivaties thereof.

While any activated carbon material may be used or combinations thereof, it is preferred to use bone black, and this term will be used throughout the description with the understanding that other activated carbon materials are the equivalent thereof, so far as the present method of purifying the waxes is concerned.

In practicing the improved method the molten wax may be percolated through a bed of bone black, or it may be agitated with a suitable quantity of bone black for the proper length of time and then separated from the bone black by filtration. It is preferred, however, to use the method of percolation, for several reasons. If the bone black be of the proper degree of fineness, the molten wax is reduced to a thin film in passing between the particles of black, thus securing a thorough contact between the two substances. By the method of percolation a uniform period of contact with bone black is assured for all of the wax. The length of time of contact may be established simply by either varying the depth of the filter bed or the rate of flow of the wax. The method of percolation also serves as a means of clarifying the wax from all suspended solids. In the conduct of percolation it is unnecessary to resort to agitation of the wax, thereby minimizing the possibility of further decomposition by action of atmospheric oxygen. It has been observed that when molten waxes are agitated with bone black the softer granules of the black become disintegrated placing fine black in suspension which is difficult to remove by ordinary filtering media. Furthermore, the bed of bone black in situ effectively clarifies the molten wax by filtering out suspended solids. It will also be obvious that less mechanical equipment will be required for purification by gravity percolation.

It is found that the absorbing power of bone black is not gravimetrically the same for all of the undesirables in the wax. Thus, complete decolorization of the wax usually ceases before complete deodorization. The complete removal of odors objectionable in general ceases before the removal of less volatile flavorous principles become incomplete. At the temperature necessary to secure proper limpidity of the wax, i. e. 190° to 220° F. there appears to occur during contact of the wax and bone black, a certain degree of cracking of the wax molecules with the production of traces of volatile derivatives. The capacity of the bone black for removing the lighter bodied odorous objectionables thus becomes expended before its capacity for absorbing the more heavily flavored objectionables is exceeded.

The most efficient and satisactory method of purifying petrolatum waxes and blends thereof for use as a lining material for beverage containers involves two stages (a) filtration of the molten wax through a bed of animal charcoal (bone black), and (b) a subsequent treatment of the filter effluent with steam, at a temperature just above the boiling point of water so as to prevent condensation and to prevent oxidation of the wax. For the practice of the invention, a vertical cylindrical or conical tank is used, the bottom of which is fitted with a drain for the removal of the filtered wax. This tank, which I will hereafter refer to as a percolator, is provided with an exterior jacket into which steam, hot water, or other heating liquid may be introduced for the purpose of maintaining a uniform degree of heat. In the bottom of the percolator, a false bottom is provided in the form of a perforated disc upon which a filtering sheet of canvas or absorbent cotton may be placed to retain any finely divided carbon that would otherwise discolor the filtered wax. There is also required, of course, a receptacle for melting the wax, means for delivering it into the top of the percolator, and a means for discharging the spent black from the percolator, all means that will be familiar to a chemical engineer. As a receiver for the filtered wax, a tank is used that is provided with either a steam jacket or a closed steam coil for the purpose of introducing or maintaining heat, and a perforated pipe by means of which dry steam may be blown through the hot filtered wax.

To charge the percolator, the false bottom is put in position and covered with a layer of absorbent cotton in quantity sufficient to be about one-half inch thick when compressed under the weight of black. On top of the cotton is placed a layer composed, for example, of approximately 1,200 units of bone black prepared as follows: Bone black of relatively uniform granulation, not coarser than #20 mesh nor finer than #80 mesh, is thoroughly dried in an oven at 210°–215° F. and kept at a temperature of approximately 180° F. until ready for use. The bone black is then placed in the percolator to form a layer about 4 feet in depth, care being taken to prevent black passing the cotton filter. The melted wax is then poured or pumped at a temperature of 210° to 220° F. into the percolator, the outlet from the percolator being allowed to remain open until the wax appears and then being closed for approximately one hour or until the cessation of bubbling indicates that essentially all of the air has been displaced by wax. Steam is then introduced into the percolator jacket to maintain a temperature of 220° F. in the wax, and the valve on the outlet tube is adjusted to permit filtered wax to flow at the rate of approximately six units per minute. The percolation of the wax is continued until an amount of wax approximately six times the unit weight of bone black present in the percolator is collected, or in other words approximately 7,200 units of wax. The supply of impure wax is then stopped and as much wax as possible is permitted to drain from the percolator.

Meanwhile the filtered wax is held at a temperature of 220° F., and upon the conclusion of the percolation live steam is introduced into the wax and the steaming continued for one hour, or longer if necessary, to expel the odor of light oils. The wax is held at 220° F. until no evidence is seen of the evaporation of water, the purified wax then drawn off into pails for storage and shipment.

A blend of petrolatum waxes having a melting point of approximately 160° F., purified as thus described, satisfies all of the conditions for lining a metallic container for beer. It retains its plasticity and its adhesion to metal at the low temperatures at which beer is filled or likely to be shipped and stored, and does not melt at the temperature or pasteurization, and does not affect in any way the flavor of the beer. If the lined metal container is to be used for fruit juices, then the blend of petrolatum waxes should have a melting point of approximately 180° F. By properly selecting and blending the petrolatum waxes a lining can be obtained for a sheet metal container which renders the container suitable for the packaging of any beverage, with all the advantages which have been noted above.

When the temperature of wax in contact with bone black is allowed to rise above 245° F. (approximately) cracking or oxidation of the wax proceeds to a pronounced degree and the products of this decomposition have an objectionable odor and taste and are produced in such quantities that the normal amount of bone black which produces wax free from flavor at 210° F. to 220° F. is not sufficient to absorb all the cracked or oxidized products produced at higher temperature of percolation. Furthermore, when molten wax first comes in contact with dry bone black, the act of wetting the black creates a quantity of heat (heat of adsorption) which under the conditions described above, results in an increase in temperature of the system amounting to 30° to 45° F. The temperature at which the bone black is charged into the percolator should therefore be low enough so that this temperature increment will not bring the entire system temperature to that at which decomposition of the wax will be initiated, and yet the bone black temperature cannot obviously be so low that the wax will freeze in the percolator.

The order of the steps is very essential. During the practicing of the first stage of the method as hereinbefore outlined, that is during contact between the hot wax and the bone black, the fixed or higher molecular weight flavor and odor constituents are removed, but there also occurs a certain degree of cracking of the wax molecules, resulting in the production of volatile derivatives which would serve to objectionably flavor beverages as hereinbefore stated. These volatile derivatives are removed by the steam treatment, that is, during the second stage of the method. It is the combination of the effects of the treatments of the petrolatum waxes by the bone black contact and the steam contact in the sequence stated that accomplishes the desired purification of the wax and removes the objectionables which impart mal-flavor, and odor to the beverage.

It has been found that the treatment with bone black as described usually results in a slight lowering of the melting point of the blended wax, due to the solvent effect of the constituents of cracking, and that the treatment with steam, by the removing of these lighter fractions remaining, or which are produced by cracking, restores the original melting point.

It is obvious that the temperature may be raised at which percolation is carried out depending on the melting point of the wax blends selected for purification and also that the portions of wax and bone black may be varied and many changes may be made in the details of the steps of the method without departing from the spirit and scope of the invention as set forth in the appended claim.

What I claim is:

The method herein described of preparing plastic petrolatum wax or waxes for use in lining sheet metal containers for beverages, which wax or combined waxes has a melting point above the normal temperature for pasteurizing beverages, consisting in heating a mass of petrolatum wax or waxes to a temperature of between 210° F. and 220° F. and percolating the fluid wax through a quantity of de-odorizing and de-colorizing carbon filtering material that has been previously dehydrated and brought to an initial temperature of approximately 180° F., whereby the heat of wetting of carbon by the wax does not bring the temperature of the mass to a point above approximately 220° F. thereby reducing to a minimum any thermal decomposition of the wax, and continuing the filtration of the wax through the carbon while maintaining the system at a temperature of approximately 220° F., and blowing steam through the percolated wax at a temperature slightly above the boiling point of water for a time sufficient to remove therefrom any retained volatile impurities and products produced by cracking during the filtration which imparts mal-flavor and mal-odor to the beverage when the container for the beverage is lined therewith.

GEORGE D. BEAL.